(12) United States Patent
Morikawa et al.

(10) Patent No.: US 9,701,816 B2
(45) Date of Patent: Jul. 11, 2017

(54) THREE-DIMENSION FORMING MATERIAL, THREE-DIMENSION FORMING SUPPORT MATERIAL, AND THREE-DIMENSION FORMING COMPOSITION SET

(71) Applicant: FUJI XEROX CO., LTD., Tokyo (JP)

(72) Inventors: Takashi Morikawa, Kanagawa (JP); Takashi Oyanagi, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 14/987,152

(22) Filed: Jan. 4, 2016

(65) Prior Publication Data
US 2017/0009059 A1    Jan. 12, 2017

(30) Foreign Application Priority Data

Jul. 8, 2015    (JP) ................. 2015-137162

(51) Int. Cl.
C08F 2/46 (2006.01)
C08F 2/50 (2006.01)
C08G 61/04 (2006.01)
C08K 5/3475 (2006.01)
C08L 71/00 (2006.01)
C08K 5/103 (2006.01)

(52) U.S. Cl.
CPC ............ C08K 5/3475 (2013.01); C08K 5/103 (2013.01); C08L 71/00 (2013.01)

(58) Field of Classification Search
CPC ........ C08K 5/3475; C08K 5/103; C08L 71/00
USPC ............... 522/75, 74, 71, 1, 189, 184; 520/1
See application file for complete search history.

(56) References Cited

U.S. PATENT DOCUMENTS

| 5,365,255 | A | 11/1994 | Inoue et al. | |
|---|---|---|---|---|
| 5,594,479 | A | 1/1997 | Inoue et al. | |
| 5,796,415 | A | 8/1998 | Inoue et al. | |
| 5,990,190 | A * | 11/1999 | Nakamura | C08F 283/01 522/107 |
| 6,562,464 | B1 * | 5/2003 | Schwalm | C07C 69/738 427/375 |
| 2006/0154180 | A1 * | 7/2006 | Kannurpatti | G03F 7/105 430/311 |
| 2006/0260506 | A1 | 11/2006 | Okuda et al. | |
| 2013/0323426 | A1 * | 12/2013 | Kaczun | C09D 11/101 427/287 |
| 2015/0353751 | A1 * | 12/2015 | Umebayashi | C09D 11/101 428/207 |

FOREIGN PATENT DOCUMENTS

| JP | H04-279358 A | 10/1992 |
|---|---|---|
| JP | 2004-117955 A | 4/2004 |
| JP | 2006-321931 A | 11/2006 |
| JP | 2007-106830 A | 4/2007 |
| JP | 2010-173078 A | 8/2010 |

* cited by examiner

Primary Examiner — Jessica E Whiteley
(74) Attorney, Agent, or Firm — Oliff PLC

(57) ABSTRACT

A three-dimension forming material includes a radiation curable compound and a benzotriazole derivative.

6 Claims, 2 Drawing Sheets

THREE-DIMENSION FORMING MATERIAL, THREE-DIMENSION FORMING SUPPORT MATERIAL, AND THREE-DIMENSION FORMING COMPOSITION SET

CROSS-REFERENCE TO RELATED APPLICATIONS

This application is based on and claims priority under 35 USC 119 from Japanese Patent Application No. 2015-137162 filed Jul. 8, 2015.

BACKGROUND

1. Technical Field

The present invention relates to a three-dimension forming material, a three-dimension forming support material, and a three-dimension forming composition set.

2. Related Art

The three-dimension forming apparatus, also called as a 3D printer, for example, is known as an apparatus for fabricating a three-dimensional structure (for example, parts of industrial products, toys such as dolls, and the like) in which the three-dimensional structure is fabricated by repeating the following processes of: disposing a forming material (model material) using an ink jet method according to three-dimensional sectional data, and curing the material with an ultraviolet ray (UV) or an electron beam (EB).

In the three-dimension forming apparatus, in order to form a freely-shaped three-dimensional structure, in the case of forming an overhang or ceiling, a support material for forming a support portion supporting the lower portion of the forming material is required.

When the discharge head of the apparatus has a single nozzle (discharge unit discharging only one composition), as the support material, the same material as the forming material is used. In this case, unlike the forming material for forming a structure, a method of lowering the density of the forming material to form the support portion and separating this support portion afterwards is used.

When the discharge head of the apparatus has a multi-nozzle (discharge unit discharging two compositions), as the support material, a dedicated material, which causes the support portion to be easily separated, is used.

SUMMARY

According to an aspect of the invention, there is provided a three-dimension forming material including a radiation curable compound and a benzotriazole derivative.

BRIEF DESCRIPTION OF THE DRAWINGS

Exemplary embodiments of the present invention will be described in detail based on the following figures, wherein.

DETAILED DESCRIPTION

Figure 1:
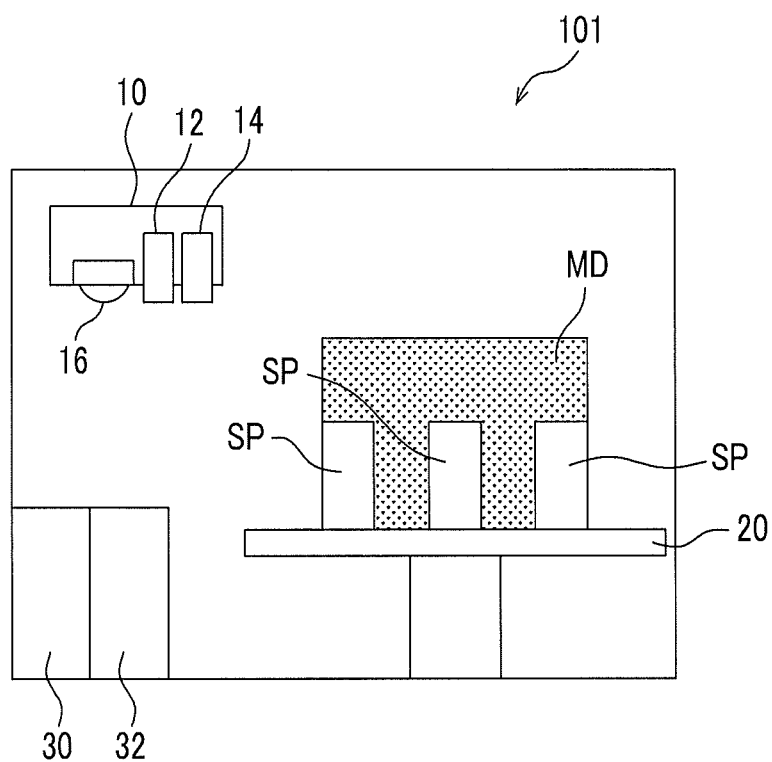
FIG. 1 is a configuration diagram schematically illustrating one example of a three-dimension forming apparatus according to the exemplary embodiment.

Hereinafter, exemplary embodiments, which are one example of the present invention, will be described in detail.

Three-Dimension Forming Material/Three-Dimension Forming Support Material

The three-dimension forming material (hereinafter, referred to as a "model material") according to the exemplary embodiment contains a radiation curable compound and a benzotriazole derivative. Meanwhile, the three-dimension forming support material (hereinafter, referred to as a "support material") according to the exemplary embodiment contains a radiation curable compound, a plasticizer, and a benzotriazole derivative. In addition, both the model material and the support material according to the exemplary embodiment are non-aqueous (a solvent-based) compositions.

Since the model material and the support material according to the exemplary embodiment contain the benzotriazole derivative, wettability is decreased. Specifically, when the model material and the support material contain the benzotriazole derivative, a contact angle with respect to the desired target surface is increased depending on the content thereof. In other words, depending on the content of the benzotriazole derivative, wettability is decreased.

Here, wettability of the model material and the support material affects discharge suitability, for example, when forming a three-dimensional structure by discharging each of the model material and the support material. In addition, a specification of a discharge unit (for example, an ink jet head, or the like) discharging each of the model material and the support material is various, and according to the specification of the discharge unit, there may be a model material and a support material in which a contact angle with respect to a discharge surface is small, and discharge suitability is hardly obtained, which may cause discharge failure.

With regard to this, since the model material and the support material according to the exemplary embodiment include a benzotriazole derivative to decrease wettability, it is realized that discharge suitability is imparted by increasing a contact angle with respect to the discharge surface of the discharge unit. It is considered that the above is because a benzotriazole derivative is coordinated on the discharge surface (for example, a metal water-repellent surface) of the discharge unit, and wettability of the discharge surface of the discharge unit is decreased (that is, a contact angle is increased). As a result, discharge failure of each of the three-dimension forming material and the three-dimension forming support material is prevented.

In addition, in the field of alloys including copper, since the benzotriazole derivative easily bonds to copper, the benzotriazole derivative is known as an anticorrosive agent. In addition, in the field of an aqueous ink, the benzotriazole derivative is known as an anticorrosive agent of the discharge surface (a metal water-repellent surface) of the discharge unit. In addition, in the field of a recording material, the benzotriazole derivative is known as an ultraviolet ray absorbent. However, in the non-aqueous model material and the support material for forming a three-dimensional structure, it is not known that the benzotriazole derivative functions as a wettability adjuster.

Model Material

Hereinafter, components of the model material according to the exemplary embodiment will be described in detail.

The model material according to the exemplary embodiment contains a radiation curable compound and a benzotriazole derivative. The model material may include other additives such as a radiation polymerization initiator, a polymerization inhibitor, a surfactant, and a coloring material, in addition to the components described above.

Benzotriazole Derivative

The benzotriazole derivative is a compound having a benzotriazole skeleton. Examples of the benzotriazole derivative include hydroxybenzotriazole, 1,2,3-benzotriazole, 1-[N,N-bis(2-ethylhexyl)aminomethyl]benzotriazole, carboxybenzotriazole, 1-[N,N-bis(2-ethylhexyl)aminomethyl]methylbenzotriazole, 2,2'-[[(methyl-1H-benzotriazole-1-yl)methyl]imino]bisethan ol, and 1,2,3-benzotriazole sodium salt.

As the benzotriazole derivative, a benzotriazole derivative having a hydroxyl group (an OH group) is preferable, from the viewpoint of adjusting wettability, and hydroxybenzotriazole is preferable.

The content of the benzotriazole derivative is preferably from 0.1% by weight to 0.5% by weight with respect to a total amount of the model material and more preferably from 0.2% by weight to 0.3% by weight from the viewpoint of adjusting wettability.

Radiation Curable Compound

The radiation curable compound is a compound which is cured (polymerized) by radiation (for example, an ultraviolet ray or an electron beam). The radiation curable compound may be a monomer or an oligomer.

Examples of the radiation curable compound include compounds having a radiation curable functional group (a radiation polymerizable functional group). Examples of the radiation curable functional group include an ethylenically unsaturated double bond (for example, a N-vinyl group, a vinyl ether group, a (meth)acryloyl group, or the like), an epoxy group, and an oxetanyl group. As the radiation curable compound, a compound having an ethylenically unsaturated bond group (more preferably a (meth)acryloyl group) is preferable.

Specifically, examples of the radiation curable compound preferably include urethane(meth)acrylate, epoxy(meth)acrylate, and polyester(meth)acrylate. Among the above, as the radiation curable compound, urethane(meth)acrylate is preferable.

In addition, in the present specification, (meth)acrylate means both acrylate and methacrylate. In addition, (meth)acryloyl means both an acryloyl group and a methacryloyl group.

Urethane(Meth)Acrylate

Urethane(meth)acrylate (hereinafter, simply "urethane(meth)acrylate") is a compound having a urethane structure and 2 or more (meth)acryloyl groups within one molecule. The urethane(meth)acrylate may be a monomer or an oligomer, but the oligomer is preferable.

The functional number of the urethane(meth)acrylate (the number of the (meth)acryloyl group) is preferably from 2 to 20 (more preferably from 2 to 15).

Examples of the urethane(meth)acrylate include reaction products using a polyisocyanate compound, a polyol compound, and (meth)acrylate containing a hydroxyl group. Specifically, examples of the urethane(meth)acrylate include reaction products of a prepolymer having an isocyanate group at the terminal and (meth)acrylate containing a hydroxyl group, the prepolymer being obtained by reacting the polyisocyanate compound and the polyol compound. In addition, examples of the urethane(meth)acrylate include reaction products of the polyisocyanate compound and (meth)acrylate containing a hydroxyl group.

Polyisocyanate Compound

Examples of the polyisocyanate compound include chain saturated hydrocarbon isocyanate, cyclic saturated hydrocarbon isocyanate, and aromatic polyisocyanate. Among the above, as the polyisocyanate compound, the chain saturated hydrocarbon isocyanate which does not have a light absorption band in a near ultraviolet region, and cyclic saturated hydrocarbon isocyanate which does not have a light absorption band in a near ultraviolet region are preferable.

Examples of the chain saturated hydrocarbon isocyanate include tetramethylene diisocyanate, hexamethylene diisocyanate, 2,2,4-trimethylhexamethylene diisocyanate, and 2,4,4-trimethylhexamethylene diisocyanate.

Examples of the cyclic saturated hydrocarbon isocyanate include isophorone diisocyanate, norbornane diisocyanate, dicyclohexyl methane diisocyanate, methylene bis(4-cyclohexyl isocyanate), hydrogenated diphenyl methane diisocyanate, hydrogenated xylene diisocyanate, and hydrogenated toluene diisocyanate.

Examples of the aromatic polyisocyanate include 2,4-tolylene diisocyanate, 1,3-xylylene diisocyanate, p-phenylene diisocyanate, 3,3'-dimethyl-4,4'-diisocyanate, 6-isopropyl-1,3-phenyl diisocyanate, and 1,5-naphthalene diisocyanate.

Polyol Compound

Examples of the polyol compound include diol and polyol.

Examples of diol include alkylene glycol (for example, ethylene glycol, 1,2-propanediol, 1,3-propanediol, 2-methyl-1,3-propanediol, 1,3-butanediol, 1,4-butanediol, 1,5-pentanediol, 2-methyl-1,5-pentanediol, neopentyl glycol, 3-methyl-1,5-pentanediol, 2,3,5-trimethyl-1,5-pentanediol, 1,6-hexanediol, 2-ethyl-1,6-hexanediol, 2,2,4-trimethyl-1,6-hexanediol, 1,8-octanediol, 1,9-nonanediol, 1,10-decanediol, 1,12-dodecanediol, 1,14-tetradecanediol, 1,16-hexadecanediol, 1,2-dimethylolcyclohexane, 1,3-dimethylolcyclohexane, and 1,4-dimethylolcyclohexane). Examples of polyol include alkylene polyol having 3 or more hydroxyl groups (for example, glycerin, trimethylolethane, trimethylolpropane, 1,2,6-hexanetriol, 1,2,4-butanetriol, erythritol, sorbitol, pentaerythritol, dipentaerythritol, and mannitol).

Examples of the polyol compound include polyether polyol, polyester polyol, and polycarbonate polyol.

Examples of the polyether polyol include a multimer of polyol, adducts of polyol and alkylene oxide, and a ring opening polymer of alkylene oxide.

Here, examples of the polyol include ethylene glycol, diethylene glycol, propylene glycol, dipropylene glycol, 1,4-butanediol, 1,3-butanediol, neopentyl glycol, 1,6-hexanediol, 1,2-hexanediol, 3-methyl-1,5-pentanediol, 2-butyl-2-ethyl-1,3-propanediol, 2,4-diethyl-1,5-pentanediol, 1,8-octanediol, 1,9-nonanediol, 2-methyl-1,8-octanediol, 1,8-decanediol, octadecanediol, glycerin, trimethylolpropane, pentaerythritol, and hexanetriol.

Examples of the alkylene oxide include ethylene oxide, propylene oxide, butylene oxide, styrene oxide, epichlorohydrin, and tetrahydrofuran.

Examples of the polyester polyol include reaction products of polyol and dibasic acid, and a ring opening polymer of a cyclic ester compound.

Here, examples of the polyol include polyols exemplified in the description of the polyether polyol.

Examples of the dibasic acid include a carboxylic acid (for example, succinic acid, adipic acid, sebacic acid, a dimer acid, maleic acid, phthalic acid, isophthalic acid, and terephthalic acid), and anhydrides of the carboxylic acid.

Examples of the cyclic ester compound include ε-caprolactone and β-methyl-δ-valerolactone.

Examples of the polycarbonate polyol include a reaction product of glycol and alkylene carbonate, a reaction product of glycol and diaryl carbonate, and a reaction product of glycoland dialkyl carbonate.

Here, examples of the alkylene carbonate include ethylene carbonate, 1,2-propylene carbonate, and 1,2-butylene carbonate. Examples of the diaryl carbonate include diphenyl carbonate, 4-methyl diphenyl carbonate, 4-ethyl diphenyl carbonate, 4-propyl diphenyl carbonate, 4,4'-dimethyl diphenyl carbonate, 2-tolyl-4-tolyl carbonate, 4,4'-diethyl diphenyl carbonate, 4,4'-dipropyl diphenyl carbonate, phenyl toluyl carbonate, bischlorophenyl carbonate, phenyl chlorophenyl carbonate, phenyl naphthyl carbonate, and dinaphthyl carbonate.

Examples of the dialkyl carbonate include dimethyl carbonate, diethyl carbonate, di-n-propyl carbonate, diisopropyl carbonate, di-n-butyl carbonate, diisobutyl carbonate, di-t-butyl carbonate, di-n-amyl carbonate, and diisoamyl carbonate.

(Meth)Acrylate Containing a Hydrogen Group

Examples of the (meth)acrylate containing a hydrogen group include 2-hydroxyethyl(meth)acrylate, 2-hydroxypropyl(meth)acrylate, 2-hydroxybutyl(meth)acrylate, 2-hydroxy-3-phenoxypropyl(meth)acrylate, glycerin di(meth)acrylate, trimethylolpropane di(meth)acrylate, pentaerythritoltri(meth)acrylate, and dipentaerythritolpenta(meth)acrylate. Examples of the (meth)acrylate containing a hydrogen group also include adducts of a compound containing a glycidyl group (for example, alkyl glycidyl ether, allyl glycidyl ether, and glycidyl(meth)acrylate) and (meth)acrylic acid.

Weight Average Molecular Weight of Urethane(Meth)Acrylate

The weight average molecular weight of the urethane (meth)acrylate is preferably from 500 to 5000 and more preferably from 1000 to 3000.

The weight average molecular weight of the urethane (meth)acrylate is a value measured by gel permeation chromatography (GPC) using polystyrene as a reference substance.

Other Radiation Curable Compounds

Examples of the radiation curable compound include other radiation curable compounds in addition to the above.

Examples of the other radiation curable compounds include (meth)acrylate (monofunctional (meth)acrylate and multifunctional (meth)acrylate), which is exemplified below.

Examples of the monofunctional (meth)acrylate include straight chain, branched, or cyclic alkyl(meth)acrylate, (meth)acrylate having a hydroxyl group, (meth)acrylate having a heterocycle, and (meth)acrylamide compounds.

Examples of the alkyl(meth)acrylate include methyl (meth)acrylate, ethyl(meth)acrylate, isobutyl(meth)acrylate, t-butyl(meth)acrylate, lauryl(meth)acrylate, stearyl(meth)acrylate, isostearyl(meth)acrylate, cyclohexyl(meth)acrylate, 4-t-cyclohexyl(meth)acrylate, isobornyl(meth)acrylate, and dicyclopentanyl(meth)acrylate.

Examples of the (meth)acrylate having a hydroxyl group include hydroxyethyl(meth)acrylate, hydroxypropyl(meth)acrylate, 4-hydroxybutyl(meth)acrylate, polyethylene glycol mono(meth)acrylate, methoxy polyethylene glycol mono(meth)acrylate, polypropylene glycol mono(meth)acrylate, methoxy polypropylene glycol mono(meth)acrylate, and mono(meth)acrylate of a block polymer of polyethylene glycol-polypropylene glycol.

Examples of the (meth)acrylate having a heterocycle include tetrahydrofurfuuryl(meth)acrylate, 4-(meth)acryloyloxymethyl-2-methyl-2-ethyl-1,3-dioxolane, 4-(meth)acryloyloxymethyl-2-cyclohexyl-1,3-dioxolane, and adamantyl (meth)acrylate.

Examples of the (meth)acrylamide compound include (meth)acrylamide, N-methyl(meth)acrylamide, N-ethyl (meth)acrylamide, N-propyl(meth)acrylamide, N-butyl (meth)acrylamide, N,N'-dimethyl(meth)acrylamide, N,N'-diethyl(meth)acrylamide, N-hydroxyethyl(meth)acrylamide, N-hydroxypropyl(meth)acrylamide, and N-hydroxybutyl(meth)acrylamide.

Among the multifunctional (meth)acrylate, examples of bifunctional (meth)acrylate include 1,10-decanediol diacrylate, 2-methyl-1,8-octanediol diacrylate, 2-butyl-2-ethyl-1,3-propanediol diacrylate, 1,9-nonanediol diacrylate, 1,8-octanediol diacrylate, 1,7-heptanediol diacrylate, polytetramethylene glycol diacrylate, 3-methyl-1,5-pentanediol diacrylate, 1,6-hexanediol diacrylate, neopentyl glycol diacrylate, hydroxypivalic acid neopentyl glycol diacrylate, tripropylene glycol diacrylate, 1,4-butanediol diacrylate, dipropylene glycol diacrylate, 2-(2-vinyloxyethoxy)ethylacrylate, EO(ethylene oxide) modified bisphenol A diacrylate, PO (propylene oxide) modified bisphenol A diacrylate, EO modified hydrogenated bisphenol A diacrylate, and EO(ethylene oxide) modified bisphenol F diacrylate.

Among the multifunctional (meth)acrylate, examples of trifunctional or more (meth)acrylate include trimethylolpropane triacrylate, ethoxylated trimethylolpropane triacrylate, propoxylated trimethylolpropane triacrylate, pentaerythritol triacrylate, ethoxylated glycerin triacrylate, tetramethylol methane triacrylate, pentaerythritol tetraacrylate, ethoxylated pentaerythritol tetraacrylate, EO(ethylene oxide) modified diglycerin tetraacrylate, ditrimethylolpropanetetraacrylate modified acrylate, dipentaerythritol pentaacrylate, and dipentaerythritol hexaacrylate.

Content of Radiation Curable Compound

The content of the radiation curable compound is preferably from 90% by weight to 99% by weight and more preferably from 93% by weight to 97% by weight with respect to a total amount of the model material.

In particular, the radiation curable compound is preferably used in combination with urethane(meth)acrylate and the other radiation curable compounds. In this case, the content of the urethane(meth)acrylate is preferably from 10% by weight to 60% by weight and more preferably from 20% by weight to 50% by weight with respect to a total amount of the model material. Meanwhile, the content of the other radiation curable compounds is preferably from 40% by weight to 75% by weight and more preferably from 50% by weight to 65% by weight with respect to a total amount of the support material.

In addition, the radiation curable compound may be used singly, or two or more thereof may be used in combination.

Radiation Polymerization Initiator

Examples of the radiation polymerization initiator include well-known polymerization initiators such as a radiation radical polymerization initiator and a radiation cationic polymerization initiator.

Examples of the radiation radical polymerization initiator include aromatic ketones, an acyl phosphine oxide compound, an aromatic onium salt compound, organic peroxides, a thio compound (a thioxanthone compound, a compound containing a thiophenyl group, or the like), a hexaaryl biimidazole compound, a ketooxime ester compound, a borate compound, an azinium compound, a metallocene compound, an active ester compound, a compound having a carbon halogen bond, and an alkylamine compound.

Examples of the radiation radical polymerization initiator include well-known radiation polymerization initiators such as acetophenone, acetophenone benzyl ketal, 1-hydroxycyclohexyl phenyl ketone, 2,2-dimethoxy-2-phenylacetophenone, xanthone, fluorenone, benzaldehyde, fluorene, anthraquinone, triphenylamine, carbazole, 3-methylacetophenone, 4-chlorobenzophenone, 4,4'-dimethoxybenzophenone, 4,4'-diaminobenzophenone, Michler ketone, benzoin propyl ether, benzoin ethyl ether, benzyl dimethylketal, 1-(4-isopropylphenyl)-2-hydroxy-2-methylpropane-1-one, 2-hydroxy-2-methyl-1-phenylpropane-1-one, thioxanthone, diethylthioxanthone, 2-isopropylthioxanthone, 2-chlorothioxanthone, 2-methyl-1-[4-(methylthio)phenyl]-2-morpholino-propane-1-one, bis(2,4,6-trimethylbenzoyl)-phenyl phosphine oxide, 2,4,6-trimethylbenzoyl-diphenyl-phosphine oxide, 2,4-diethylthioxanthone, and bis-(2,6-dimethoxybenzoyl)-2,4,4-trimethylpentylphosphine oxide.

Content of Radiation Polymerization Initiator

The content of the radiation polymerization initiator is preferably, for example, from 1% by weight to 10% by weight and more preferably from 3% by weight to 5% by weight with respect to the radiation curable compound.

In addition, the radiation polymerization initiator may be used singly, or two or more thereof may be used in combination.

Polymerization Inhibitor

Examples of the polymerization inhibitor include well-known polymerization inhibitors such as a phenolic polymerization inhibitor (for example, p-methoxyphenol, cresol, t-butylcatechol, 3,5-di-t-butyl-4-hydroxytoluene, 2,2'-methylenebis(4-methyl-6-t-butylphenol), 2,2'-methylenebis(4-ethyl-6-t-butylphenol), 4,4'-thiobis(3-methyl-6-t-butylphenol), or the like), hindered amine, hydroquinone monomethyl ether (MEHQ), and hydroquinone.

Content of Polymerization Inhibitor

The content of the polymerization inhibitor is preferably, for example, from 0.1% by weight to 1% by weight and more preferably from 0.3% by weight to 0.5% by weight with respect to the radiation curable compound.

In addition, the polymerization inhibitor may be used singly, or two or more thereof may be used in combination.

Surfactant

Examples of the surfactant include well-known surfactants such as a silicone surfactant, an acrylic surfactant, a cationic surfactant, an anionic surfactant, a nonionic surfactant, an amphoteric surfactant, and a fluorine surfactant.

Content of Surfactant

The content of the surfactant is preferably, for example, from 0.05% by weight to 0.5% by weight and more preferably from 0.1% by weight to 0.3% by weight with respect to the radiation curable compound.

In addition, the surfactant may be used singly, or two or more thereof may be used in combination.

Other Additives

In addition to the above, examples of the other additives include well-known additives such as a coloring material, a solvent, a sensitizer, a fixing agent, an antifungal agent, a preservative, an antioxidant, an ultraviolet ray absorbent, a chelating agent, a thickening agent, a dispersant, a polymerization promoter, a permeation promoter, and a humectant (moisturizing agent).

Properties of Model Material

The surface tension of the model material is, for example, in a range from 20 mN/m to 40 mN/m.

Here, the surface tension is a measured value using a Wilhelmy type surface tensiometer (manufactured by Kyowa Interface Science Co., LTD.), in an environment of 23° C. and 55% RH.

The viscosity of the model material is, for example, in a range from 30 mPa·s to 50 mPa·s.

Here, the viscosity is a measured value using a Rheomat 115 (manufactured by Contraves Co.) as a measuring apparatus, at a measuring temperature of 23° C. and a shear rate of 1400 $s^{-1}$.

Support Material

Hereinafter, components of the support material according to the exemplary embodiment will be described in detail.

The support material according to the exemplary embodiment contains a radiation curable compound, a plasticizer, and a benzotriazole derivative. The support material may contain other additives such as a radiation polymerization initiator, a polymerization inhibitor, a surfactant, and a coloring material, in addition to the components described above.

In addition, the support material may use the components exemplified in the model material, in addition to the plasticizer. In addition, the properties of the support material are in the same range as the properties of the model material. Therefore, description of materials other than the plasticizer will be omitted.

Plasticizer

Examples of the plasticizer include water, and a non-radiation curable polymer. The non-radiation curable polymer is a polymer in which a curing (polymerization) reaction does not occur by radiation (for example, an ultraviolet ray or an electron beam).

As the non-radiation curable polymer, at least one type selected from the group consisting of polyether polyol, castor oil polyol, and polyester polyol, is preferable.

Polyether Polyol

Examples of the polyether polyol include a multimer of polyol, adducts of polyol and alkylene oxide, and a ring opening polymer of alkylene oxide.

Examples of the polyol include ethylene glycol, diethylene glycol, propylene glycol, dipropylene glycol, 1,4-butanediol, 1,3-butanediol, neopentyl glycol, 1,6-hexanediol, 1,2-hexanediol, 3-methyl-1,5-pentanediol, 2-butyl-2-ethyl-1,3-propanediol, 2,4-diethyl-1,5-pentanediol, 1,8-octanediol, 1,9-nonanediol, 2-methyl-1,8-octanediol, 1,8-decanediol, octadecanediol, glycerin, trimethylolpropane, pentaerythritol, and hexanetriol.

Examples of the alkylene oxide include ethylene oxide, propylene oxide, butylene oxide, styrene oxide, epichlorohydrin, and tetrahydrofuran.

Castor Oil Polyol

Examples of the castor oil polyol include a modified castor oil in which castor oil is modified with polyol, and a modified castor oil fatty acid in which a castor oil fatty acid (a fatty acid obtained from the castor oil) is modified with polyol.

Examples of the polyol include polyols exemplified in the description of the polyether polyol.

Polyester Polyol

Examples of the polyester polyol include reaction products of polyol and dibasic acid, and a ring opening polymer of a cyclic ester compound.

Here, examples of the polyol include polyols exemplified in the description of the polyether polyol.

Examples of the dibasic acid include a carboxylic acid (for example, succinic acid, adipic acid, sebacic acid, a dimer acid, maleic acid, phthalic acid, isophthalic acid, and terephthalic acid), and anhydrides of the carboxylic acid.

Examples of the cyclic ester compound include ε-caprolactone and β-methyl-δ-valerolactone.

Here, as the non-radiation curable polymer, the various polyols described above and the polyol may be used in combination. In particular, the polyol is preferably used in combination with the polyester polyol. That is, as the non-radiation curable polymer, a mixture of the polyester polyol and the polyol may be exemplified.

The content of the polyol to be used in combination with the various polyols described above is preferably from 30% by weight to 60% by weight (more preferably from 35% by weight to 50% by weight) with respect to entire radiation curable polymers. In particular, in a case where the mixture of the polyester polyol and the polyol is used, the weight ratio (polyester polyol/polyol) is preferably from 30/70 to 10/90 (more preferably from 25/75 to 20/80).

In addition, examples of the polyol include polyols exemplified in the description of polyether polyol.

Weight Average Molecular Weight of Non-Radiation Curable Polymer

The weight average molecular weight of the non-radiation curable polymer is preferably from 200 to 1,000, and more preferably from 250 to 850.

The weight average molecular weight of the non-radiation curable polymer is a value measured by gel permeation chromatography (GPC) using polystyrene as a reference substance.

Content of Plasticizer

The content of the plasticizer is preferably, for example, from 25% by weight to 60% by weight, more preferably from 30% by weight to 55% by weight, and even more preferably from 35% by weight to 50% by weight with respect to a total amount of the support material.

In addition, the non-radiation curable polymer may be used singly, or two or more thereof may be used in combination.

Here, since the support material contains a plasticizer, the content of the radiation curable compound is preferably from 40% by weight to 75% by weight and more preferably from 50% by weight to 65% by weight with respect to a total amount of the support material.

In particular, in the support material, as the radiation curable compound, it is preferable to use the urethane(meth)acrylate and the other radiation curable compounds in combination, similar to the model material. In this case, the content of the urethane(meth)acrylate is preferably from 5% by weight to 45% by weight and more preferably from 10% by weight to 35% by weight with respect to a total amount of the support material. Meanwhile, the content of the other radiation curable compound described above is preferably from 10% by weight to 70% by weight and more preferably from 20% by weight to 65% by weight with respect to a total amount of the support material.

Three-Dimension Forming Composition Set

A three-dimension forming composition set according to the exemplary embodiment has the model material (three-dimension forming material) containing a radiation curable compound and the support material (three-dimension forming support material) containing a radiation curable compound and a plasticizer, and the three-dimension forming material or the three-dimension forming support material contains a benzotriazole derivative.

In the three-dimension forming composition set according to the exemplary embodiment, since the model material or the support material contains a benzotriazole derivative, adjustment of the difference in wettability between the model material and support material is realized. Specifically, adjustment of the difference in wettability between the model material and the support material is realized, by containing a benzotriazole derivative in only one of the model material and the support material, and increasing a contact angle with respect to the desired target surface depending on the amount thereof.

Here, for example, in a case where a three-dimensional structure is formed by respectively discharging the model material and the support material, a model portion (a formed portion) in which the model material is cured and a support portion in which the support material (a support portion) is cured are formed adjacent to each other. At this time, in a case where one of the model material and the support material are discharged on the surface of the formed portion after curing, the surface of the support portion, or the surface at the same level, the model material and the support material are not mixed. Meanwhile, in order to increase a forming speed, in a case where the model portion and the support portion are formed by discharging the model material and the support material on the surface at the same level and curing the materials at the same time, the model material and the support material may be mixed at an interface. Therefore, hydrophobicity of both the materials may be changed, or the difference of the SP values (a solubility parameter) between both the materials may be increased.

However, in this case, wettability of the model material and the support material becomes different, and discharge suitability with respect to the discharge units having the same specification is changed. That is, a contact angle of both the materials with respect to the discharge surfaces of the discharge units having the same specification is changed. In this way, one of the materials has discharge suitability, and the other has low discharge suitability, which may cause discharge failure.

In order to cope with this situation, it is known to employ discharge units having different specifications for each of the model material and the support material, or to perform Teflon processing on the discharge surface of the discharge unit, which causes a cost increase of an apparatus or for use.

With respect to this, in the three-dimension forming composition set according to the exemplary embodiment, the model material or the support material contains a benzotriazole derivative, and the difference in wettability between the model material and the support material is adjusted (that is, the difference in wettability is decreased). Thus, even in a case where the discharge units having the same specification are used, imparting of discharge suitability to both the model material and the support material is realized. As a result, discharge failure of the three-dimension forming material or the three-dimension forming support material, which is caused from the difference in wettability between the three-dimension forming material and the three-dimension forming support material, is prevented.

Here, in the three-dimension forming composition set according to the exemplary embodiment, from the viewpoint of decreasing the difference in wettability between the model material and the support material, with respect to the model material and the support material which are in a state of not containing a benzotriazole derivative, when the contact angle with respect to the same target surface is measured under the same condition, it is preferable to incorporate a benzotriazole derivative in the material having a smaller contact angle among the two materials.

In the three-dimension forming composition set according to the exemplary embodiment, aspects of the model material and the support material are the same as the aspects described in the model material and the support material according to the exemplary embodiment, except the presence of the benzotriazole derivative or not. Therefore, the description will be omitted.

Three-Dimension Forming Apparatus/Method of Preparing a Three-Dimensional Structure A three-dimension forming apparatus according to the exemplary embodiment includes a first discharge unit having the model material (three-dimension forming material) among the three-dimension forming composition set according to the exemplary embodiment accommodated therein and discharging the model material, a second discharge unit having the support material (three-dimension forming support material) among the three-dimension forming composition set according to the exemplary embodiment accommodated therein and discharging the support material, and a radiation irradiation unit which irradiates radiation to cure the discharged model material and the support material.

In the three-dimension forming apparatus according to the exemplary embodiment, a method of preparing a three-dimensional structure (the method of preparing a three-dimensional structure according to the exemplary embodiment) including: discharging the model material (three-dimension forming material) among the three-dimension forming composition set according to the exemplary embodiment and curing the model material with radiation irradiation to form a structure; and discharging the support material (three-dimension forming support material) among the three-dimension forming composition set according to the exemplary embodiment and curing the support material with radiation irradiation to form a support portion for supporting at least a part of the structure, is executed. In addition, in the method of preparing a three-dimensional structure according to the exemplary embodiment, the three-dimensional structure is prepared by removing the support portion after forming the support portion.

In addition, the three-dimension forming apparatus according to the exemplary embodiment may include a model material cartridge (three-dimension forming material cartridge), which is configured as a cartridge so as to accommodate the model material and be detachable from the three-dimension forming apparatus. In addition, in the same manner, the three-dimension forming apparatus may include a support material cartridge (three-dimension forming support material cartridge), which is configured as a cartridge so as to accommodate the support material and be detachable from the three-dimension forming apparatus.

Hereinafter, the three-dimension forming apparatus according to the exemplary embodiment will be described with reference to the drawings.

FIG. 1 is a configuration view schematically illustrating one example of a three-dimension forming apparatus according to the exemplary embodiment.

A three-dimension forming apparatus 101 according to the exemplary embodiment is an ink jet type three-dimension forming apparatus. As illustrated in FIG. 1, the three-dimension forming apparatus 101 includes, for example, a forming unit 10 and a forming board 20. In addition, the three-dimension forming apparatus 101 includes a model material cartridge 30 having the model material accommodated therein and a support material cartridge 32 having the support material accommodated therein such that the cartridges are detachable from the apparatus. In addition, in FIG. 1, MD indicates a structure and SP indicates a support portion.

The forming unit 10 includes for example, a model material discharge head 12 (one example of the first discharge unit) for discharging a droplet of the model material, a support material discharge head 14 (one example of the second discharge unit) for discharging a droplet of the support material, and a radiation irradiation device 16 (radiation irradiation device) applying radiation. In addition to the above, the forming unit 10 may include (not illustrated), for example, a rotation roller for removing excess model material and the support material remaining in the model material and the support material discharged on the forming board 20 and flattening the materials.

The forming unit 10 is configured, for example, to be movable over a forming region of the forming board 20 by a driving unit (not illustrated) in a main scanning direction and in a sub-scanning direction intersecting with (for example, perpendicular to) the main scanning direction (so-called a carriage type).

As for the respective model material discharge head 12 and the support material discharge head 14, a piezo type (piezoelectric type) discharge head for discharging droplets of each material by pressure is adopted. Each of the discharge heads is not limited thereto, and the head may be a discharge head for discharging each material by pressure from a pump.

The model material discharge head 12 is, for example, connected to the model material cartridge 30 through a supply line (not illustrated). In addition, the model material is supplied to the model material discharge head 12 from the model material cartridge 30.

The support material discharge head 14 is, for example, connected to the support material cartridge 32 through a supply line (not illustrated). In addition, the support material is supplied to the support material discharge head 14 from the support material cartridge 32.

Each of the model material discharge head 12 and the support material discharge head 14 is short-length discharge head configured to have an effective discharge region (arrangement region of the nozzles discharging the model material and the support material) smaller than the forming region of the forming board 20.

In addition, each of the model material discharge head 12 and the support material discharge head 14 may be an elongated head, for example, configured to have an effective discharge region (arrangement region of the nozzles discharging the model material and the support material) larger than the width of the forming region (length in a direction intersecting with (for example, perpendicular to) the moving direction (main scanning direction) of the forming unit 10) on the forming board 20. In this case, the forming unit 10 is configured to move only in the main scanning direction.

The radiation irradiation device 16 is selected depending on the type of the model material and the support material. Examples of the radiation irradiation device 16 include an ultraviolet ray irradiation device and an electron beam irradiation device.

Here, examples of the ultraviolet ray irradiation device include devices having a light source, such as a metal halide lamp, a high pressure mercury lamp, an ultrahigh pressure mercury lamp, a deep ultraviolet ray lamp, a lamp to excite a mercury lamp without electrodes from the outside using microwaves, an ultraviolet ray laser, a xenon lamp, and UV-LED.

Examples of the electron beam irradiation device include a scanning type electron beam irradiation device, a curtain type electron beam irradiation device, and a plasma discharge type electron beam irradiation device.

The forming board 20 has a surface having a forming region where a structure is formed by the model material and the support material being discharged. In addition, the forming board 20 is configured to be freely lifted by the driving unit (not illustrated).

Next, an operation of the three-dimension forming apparatus 101 according to the exemplary embodiment (method of preparing a three-dimensional structure) will be described.

First, through a computer (not illustrated), as data for three-dimension formation, for example, two-dimensional shape data (slice data) for forming a structure are created from, for example, three-dimensional Computer Aided Design (CAD) data of the three-dimensional structure formed by the model material. At this time, the two-dimensional shape data (slice data) for forming a support portion using the support material is also created. The two-dimensional shape data for forming a support portion is configured such that, in a case where the width of an upper structure is greater than the width of a lower structure, in other words, when there is an overhanging portion, the support portion is formed to support the overhanging portion from below.

Next, based on the two-dimensional shape data for forming a structure, the model material is discharged from the model material discharge head 12 while moving the forming unit 10, so as to form a layer of the model material on the forming board 20. Then, the layer of the model material is irradiated with radiation by the radiation irradiation device 16 to cure the model material, thereby forming a layer to be a part of the structure.

If necessary, based on the two-dimensional shape data for forming a support portion, the support material is discharged from the support material discharge head 14 while moving the forming unit 10, so as to form a layer of the support material adjacent to the layer of the model material on the forming board 20. Then, the layer of the support material is irradiated with radiation by the radiation irradiation device 16 to cure the support material, thereby forming a layer to be a part of the support portion.

Figure 2A:
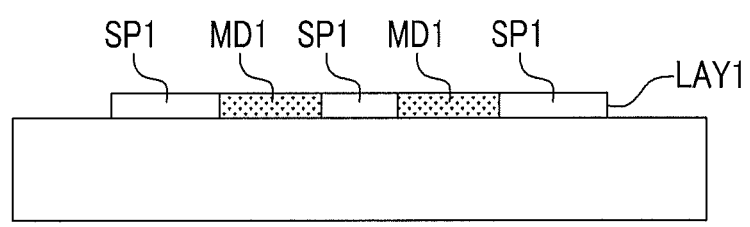
FIG. 2A is a process diagram illustrating one example of a method of preparing a three-dimensional structure according to the exemplary embodiment.

In this way, a first layer LAY1 including the layer to be a part of the structure and, if necessary, the layer to be a part of the support portion is formed (refer to FIG. 2A). Here, in FIG. 2A, MD1 indicates the layer to be a part of the structure in the first layer LAY1, and SP1 indicates the layer to be a part of the support portion in the first layer LAY1.

Next, the forming board 20 descends. Due to descending of the forming board 20, the thickness of the second layer to be formed next (the second layer including the layer to be a part of the structure and, if necessary, the layer to be a part of the support portion), is set.

Figure 2B:
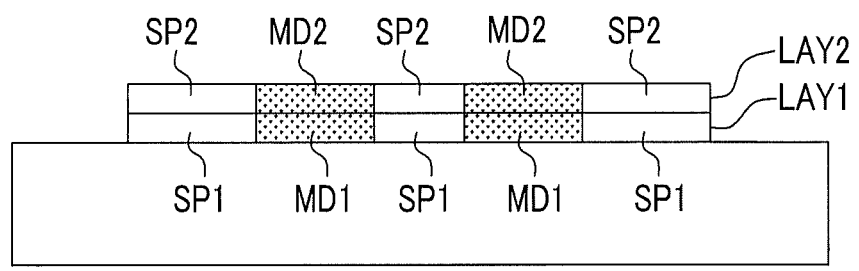
FIG. 2B is a process diagram illustrating one example of a method of preparing a three-dimensional structure according to the exemplary embodiment.

Next, in the same manner as the first layer LAY1, a second layer LAY2, including the layer to be a part of the structure and, if necessary, the layer to be a part of the support portion, is formed (refer to FIG. 2B). Here, in FIG. 2B, MD2 indicates the layer to be a part of the structure in the second layer LAY2, and SP2 indicates the layer to be a part of the support portion in the second layer LAY2.

Figure 2C:
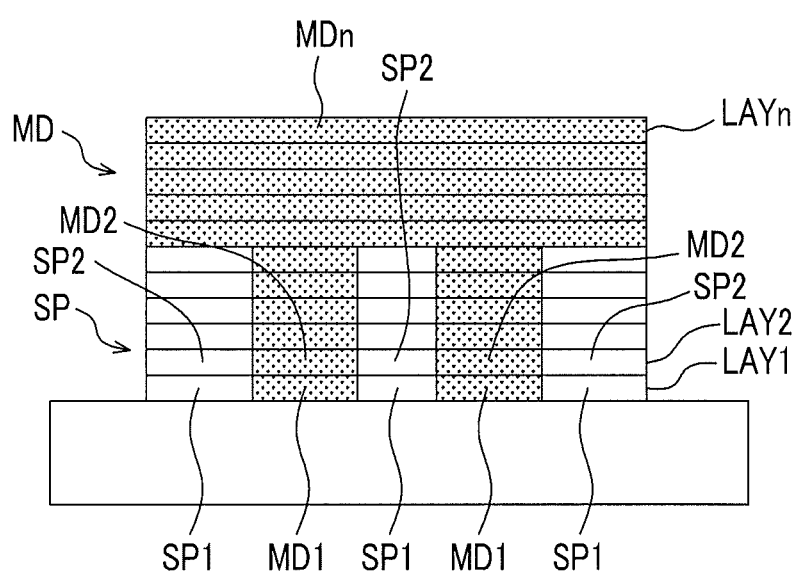
FIG. 2C is a process diagram illustrating one example of a method of preparing a three-dimensional structure according to the exemplary embodiment.

In addition, operations for forming the first layer LAY1 and the second layer LAY2 are executed repeatedly to form layers up to the $n^{th}$ layer LAYn. In this case, a structure of which at least a part that is supported by the support portion is formed (refer to FIG. 2C). Here, in FIG. 2C, MDn indicates a layer to be a part of the structure in the $n^{th}$ layer LAYn. MD indicates the structure. SP indicates the support portion.

After that, when the support portion is removed from the structure, a desired structure is obtained. Here, as the method of removing the support portion, for example, a method of removing the portion by hands (break away method), or a method of removal by spraying gas or liquid, is adopted.

In addition, the obtained structure may be subjected to post-treatment such as polishing.

EXAMPLES

Hereinafter, the invention will be described in detail based on Examples, but the invention is not limited to Examples described below. In addition, "parts" refer to "parts by weight" unless otherwise specifically indicated.

Example 1

Model Material MA1

Urethane acrylate oligomer: 12.7 parts by weight ("U-200PA" manufactured by Shin-Nakamura Chemical Co., Ltd.)

Urethaneacrylate oligomer: 16.4 parts by weight ("UA-4200" manufactured by Shin-Nakamura Chemical Co., Ltd.)

Acrylate monomer: 50.4 parts by weight ("VEEA-AI" manufactured by Nippon Shokubai Co., Ltd., 2-(2-vinyloxythoxy)ethylacrylate)

Acrylate monomer: 14.7 parts by weight ("IBXA" manufactured by Osaka Organic Chemical Industry Co., Ltd., isobornylacrylate)

Polymerization inhibitor: 0.5 parts by weight (MEHQ (hydroquinone monomethylether))

Polymerization initiator: 3.0 parts by weight ("LUCIRIN TPO" manufactured by BASF Corporation, 2,4,6-trimethylbenzoyl-diphenyl-phosphineoxide)

Polymerization initiator: 1.0 part by weight ("Irgacure 379" manufactured by BASF Corporation, 2-dimethylamino-2-(4-methylbenzyl)-1-(4-morpholine-4-yl-phenyl)-butane-1-one)

Sensitizer: 1.0 part by weight (ITX (2-isopropylthioxanthone))

Cyan pigment: 0.1 parts by weight ("KY410-4B" manufactured by Taisei Kako Co., Ltd.)

Surfactant: 0.2 parts by weight ("TEGO Wet 270" manufactured by Evonik Degussa Japan Co., Ltd., polyether modified siloxane copolymer)

The model material MA1 is prepared by mixing the components described above.

Support Material SA1

Urethaneacrylate oligomer: 8.3 parts by weight ("U-200PA" manufactured by Shin-Nakamura Chemical Co., Ltd.)

Urethaneacrylate oligomer: 10.7 parts by weight ("UA-4200" manufactured by Shin-Nakamura Chemical Co., Ltd.)

Acrylatea monomer: 32.2 parts by weight ("VEEA" manufactured by Nippon Shokubai Co., Ltd., 2-(2-vinyloxythoxy)ethylacrylate)

Acrylate monomer: 9.5 parts by weight ("IBXA" manufactured by Osaka Organic Chemical Industry Co., Ltd., isobornylacrylate)

Polymerization inhibitor: 0.3 parts by weight (MEHQ (hydroquinone monomethylether))

Polymerization initiator: 2.0 parts by weight ("LUCIRIN TPO" manufactured by BASF Corporation, 2,4,6-trimethylbenzoyl-diphenyl-phosphineoxide)

Polymerization initiator: 0.7 parts by weight ("Irgacure 379" manufactured by BASF Corporation, 2-dimethylamino-2-(4-methylbenzyl)-1-(4-morpholine-4-yl-phenyl)-butane-1-one)

Sensitizer: 0.7 parts by weight (ITX (2-isopropylthioxanthone))

Polyether polyol: 35.0 parts by weight ("Adekapolyether P-400" manufactured by ADEKA Corporation)

Surfactant: 0.7 parts by weight ("TEGO Wet 270" manufactured by Evonik Degussa Japan Co., Ltd., polyether modified siloxane copolymer)

The support material SA1 is prepared by mixing the components described above.

Support Materials SA2 to SA4

As a benzotriazole derivative, hydroxybenzotriazole (HOBT) is mixed with the support material Si, in an amount of 0.1% by weight, 0.2% by weight, and 0.3% by weight, respectively, with respect to a total amount of the support material to prepare support materials SA2 to SA4.

Measurement of Contact Angle with Respect to Discharge Surface of Ink Jet Head

The contact angle of the model material MA1 and support materials SA1 to SA4 with respect to the discharge surface (water-repellent surface made of gold) of the ink jet head (Polaris head (model number PQ512/85), manufactured by Fujifilm Dimatix Inc.) is measured respectively. The result is shown in Table 1. In addition, in Table 1, the contact angle with respect to the discharge surface of the ink jet head is referred to as a "contact angle with respect to the head".

Measurement of Contact Angle

The contact angle is measured under the condition of 23° C. and 55% RH using a contact angle meter "trade name CA-X (manufactured by Kyowa Interface Science Co., LTD.)", at 5 seconds after 3 μl of the model material or the support material is added dropwise on the discharge surface of the head.

TABLE 1

| | Model material MA1 | Support material SA1 | Support material SA2 | Support material SA3 | Support material SA4 |
|---|---|---|---|---|---|
| HOBT content (% by weight) | 0 | 0 | 0.1 | 0.2 | 0.3 |
| Contact angle with respect to the head (°) | 16.3 | 10.7 | 13.0 | 15.7 | 15.9 |

From the result of Table 1, in the model material MA1 and the support material SA1 not containing hydroxybenzotriazole (HOBT) as a benzotriazole derivative, the contact angle with respect to the head is smaller in the support material SA1 than that in the mode material MA1, and the difference between the contact angles with respect to the head is 5.6. Therefore, discharge suitability of the support material SA1 with respect to the head is not obtained and discharge failure (increase in the number of nozzles which do not discharge) is caused.

In contrast, in the model material MA1 and the support materials SA2 to SA4 containing hydroxybenzotriazole (HOBT), it is understood that the difference of the contact angle with respect to the head is small. In particular, it is understood that in the support material SA3 having 0.2% by weight of hydroxybenzotriazole (HOBT) and the support material SA4 having 0.3% by weight of hydroxybenzotriazole (HOBT) with respect to a total amount of the support material, the contact angle with respect to the head is increased as much as the model material MA1.

From the above, it is understood that due to the benzotriazole derivative, the difference in wettability between the model material and the support material is decreased, discharge suitability with respect to the ink jet head is imparted to both the model material and the support material, discharge failure is prevented (the number of nozzles which do not discharge is decreased), and reliability is increased.

Example 2

Model Material MB1

Uurethaneacrylate oligomer: 14.6 parts by weight ("U-200PA" manufactured by Shin-Nakamura Chemical Co., Ltd.)

Urethaneacrylate oligomer: 15.2 parts by weight ("UA-4200" manufactured by Shin-Nakamura Chemical Co., Ltd.)

Acrylate monomer: 30.1 parts by weight ("VEEA-AI" manufactured by Nippon Shokubai Co., Ltd., 2-(2-vinyloxythoxy)ethylacrylate)

Acrylate monomer: 34.3 parts by weight ("IBXA" manufactured by Osaka Organic Chemical Industry Co., Ltd., isobornylacrylate)

Polymerization inhibitor: 0.5 parts by weight (MEHQ (hydroquinone monomethylether))

Polymerization initiator: 3.0 parts by weight ("LUCIRIN TPO" manufactured by BASF Corporation, 2,4,6-trimethylbenzoyl-diphenyl-phosphineoxide)

Polymerization initiator: 1.0 part by weight ("Irgacure 379" manufactured by BASF Corporation, 2-dimethylamino-2-(4-methylbenzyl)-1-(4-morpholine-4-yl-phenyl)-butane-1-one)

Sensitizer: 1.0 part by weight (ITX (2-isopropylthioxanthone))

Cyan pigment: 0.1 parts by weight ("KY410-4B" manufactured by Taisei Kako Co., Ltd.)

Surfactant: 0.2 parts by weight ("TEGO Wet 270" manufactured by Evonik Degussa Japan Co., Ltd., polyether modified siloxane copolymer)

The model material MB1 is prepared by mixing the components described above.

Model Materials MB2 to MB4

As a benzotriazole derivative, hydroxybenzotriazole (HOBT) is mixed with the model material MB1, in an amount of 0.1% by weight, 0.2% by weight, and 0.3% by weight respectively with respect to a total amount of the model material to prepare model materials MB2 to MB4.

Support Material SB1

Urethaneacrylate oligomer: 8.3 parts by weight ("U-200PA" manufactured by Shin-Nakamura Chemical Co., Ltd.)

Urethaneacrylate oligomer: 10.7 parts by weight ("UA-4200" manufactured by Shin-Nakamura Chemical Co., Ltd.)

Acrylate monomer: 32.1 parts by weight ("VEEA" manufactured by Nippon Shokubai Co., Ltd., 2-(2-vinyloxythoxy)ethylacrylate)

Acrylate monomer: 9.5 parts by weight ("IBXA" manufactured by Osaka Organic Chemical Industry Co., Ltd., isobornylacrylate)

Polymerization inhibitor: 0.9 parts by weight (MEHQ (hydroquinone monomethylether))

Polymerization initiator: 2.0 parts by weight ("LUCIRIN TPO" manufactured by BASF Corporation, 2,4,6-trimethylbenzoyl-diphenyl-phosphineoxide)

Polymerization initiator: 0.7 parts by weight ("Irgacure 379" manufactured by BASF Corporation, 2-dimethylamino-2-(4-methylbenzyl)-1-(4-morpholine-4-yl-phenyl)-butane-1-one)

Castor oil polyol: 19.3 parts by weight ("URIC H-31" manufactured by ITOH OIL CHEMICALS CO., LTD.))

Castor oil polyol: 15.8 parts by weight ("URIC H-62" manufactured by ITOH OIL CHEMICALS CO., LTD.))

Sensitizer: 0.7 parts by weight (ITX (2-isopropylthioxanthone))

Surfactant: 0.7 parts by weight ("TEGO Wet 270" manufactured by Evonik Degussa Japan Co., Ltd., polyether modified siloxane copolymer)

The support material SB1 is prepared by mixing the components described above.

Measurement of Contact Angle with Respect to Discharge Surface of Ink Jet Head

The contact angle of the materials MB1 to MB4 and the support material SB1 with respect to the discharge surface (water-repellent surface made of gold) of the ink jet head (Polaris head (model number PQ512/85), manufactured by Fujifilm Dimatix Inc.) is measured respectively. The result is shown in Table 2. The measurement of the contact angle is as described above. In addition, in Table 2, the contact angle with respect to the discharge surface of the ink jet head is referred to as a "contact angle with respect to the head".

TABLE 2

|  | Model material MB1 | Model material MB2 | Model material MB3 | Model material MB4 | Support material SB1 |
|---|---|---|---|---|---|
| HOBT Content (% by weight) | 0 | 0.1 | 0.2 | 0.3 | 0 |
| Contact angle with respect to the head (°) | 20.8 | 22.1 | 25.7 | 25.9 | 25.3 |

From the result of Table 2, in the model material MB1 and the support material SB1 not containing hydroxybenzotriazole (HOBT) as a benzotriazole derivative, the contact angle with respect to the head is smaller in the model material MB1 than that in the support material SB1, and the difference between the contact angles with respect to the head is 4.5. Therefore, discharge suitability of the model material MB1 with respect to the head is not obtained and discharge failure (increase in the number of nozzles which do not discharge) is caused.

In contrast, in the model materials MB2 to MB4 and the support material SB1 containing hydroxybenzotriazole (HOBT), it is understood that the difference of the contact angle with respect to the head is small. In particular, it is understood that in the model material MB3 having 0.2% by weight of hydroxybenzotriazole (HOBT) and the model material MB4 having 0.3% by weight of hydroxybenzotriazole (HOBT) with respect to a total amount of the model material, the contact angle with respect to the head is increased as much as the support material SB1.

From the above, it is understood that due to the benzotriazole derivative, the difference in wettability between the model material and the support material is decreased, discharge suitability with respect to the ink jet head is imparted to both the model material and the support material, discharge failure is prevented (the number of nozzles which do not discharge is decreased), and reliability is increased.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A three-dimension forming composition set comprising:
    a three-dimension forming material that contains a radiation curable compound; and
    a three-dimension forming support material that contains a radiation curable compound and a plasticizer,
    wherein:
        only one of the three-dimension forming material or the three-dimension forming support material contains a benzotriazole derivative;
        when a contact angle of each of the three-dimension forming material and the three-dimension forming support material is measured with respect to the same target surface under the same condition, the material that contains the benzotriazole derivative has a smaller contact angle than the material that does not contain the benzotriazole derivative; and
        the three-dimension forming material and the three-dimension forming support material are each suitable for discharge from an ink jet head.

2. The three-dimension forming composition set according to claim 1, wherein the benzotriazole derivative is hydroxybenzotriazole.

3. The three-dimension forming composition set according to claim 1, wherein the content of the benzotriazole derivative is from 0.1% by weight to 0.5% by weight with respect to a total amount of the three-dimension forming material or a total amount of the three-dimension forming support material.

4. The three-dimension forming composition set according to claim 2, wherein the content of the benzotriazole derivative is from 0.1% by weight to 0.5% by weight with respect to a total amount of the three-dimension forming material or a total amount of the three-dimension forming support material.

5. The three-dimension forming composition set according to claim 1, wherein the three-dimension forming material has a viscosity in a range of 30 mPa·s to 50 mPa·s at 23° C.

6. The three-dimension forming composition set according to claim 1, wherein the three-dimension forming support material has a viscosity in a range of 30 mPa·s to 50 mPa·s at 23° C.

* * * * *